United States Patent
Bolbanat

(10) Patent No.: US 8,759,722 B2
(45) Date of Patent: Jun. 24, 2014

(54) BABY FEEDING APPARATUS

(76) Inventor: Abeer Abdullah Bolbanat, Rumaithiya (KW)

(*) Notice: Subject to any disclaimer, the term of this patent is extended or adjusted under 35 U.S.C. 154(b) by 464 days.

(21) Appl. No.: 12/724,605

(22) Filed: Mar. 16, 2010

(65) Prior Publication Data

US 2011/0226134 A1    Sep. 22, 2011

(51) Int. Cl.
  *F27D 11/00* (2006.01)
  *A47J 37/12* (2006.01)
(52) U.S. Cl.
  USPC ............ 219/433; 219/429; 219/432; 99/483; 99/327
(58) Field of Classification Search
  USPC ........ 219/429, 432–4; 99/483, 327, 332, 348, 99/344
  See application file for complete search history.

(56) References Cited

U.S. PATENT DOCUMENTS

| | | |
|---|---|---|
| 4,597,435 A | 7/1986 | Fosco, Jr. |
| 5,797,313 A * | 8/1998 | Rothley ................... 99/483 |
| 5,808,276 A | 9/1998 | Padilla |
| 5,975,337 A | 11/1999 | Hadley |
| 6,417,498 B1 | 7/2002 | Shields et al. |
| 6,809,302 B1 | 10/2004 | Jones et al. |
| 6,953,914 B2 | 10/2005 | Suzuki et al. |
| 7,287,656 B2 | 10/2007 | Guilford, III et al. |

\* cited by examiner

*Primary Examiner* — Shawntina Fuqua
(74) *Attorney, Agent, or Firm* — Lowe Hauptman & Ham LLP

(57) ABSTRACT

A baby feeding apparatus for the preparation and warming of infant formula with audio instructions includes a baby bottle having a well and an electrical probe for insertion into the well for heating the contents of the bottle. The apparatus also includes a reservoir for containing a supply of heated fluids such as water for maintaining the temperature of the infant formula and a visual and audio indicator to advise an individual when the temperature of the formula is appropriate for feeding a child. A brush for cleaning the bottle and a cover for the apparatus are also provided.

1 Claim, 3 Drawing Sheets

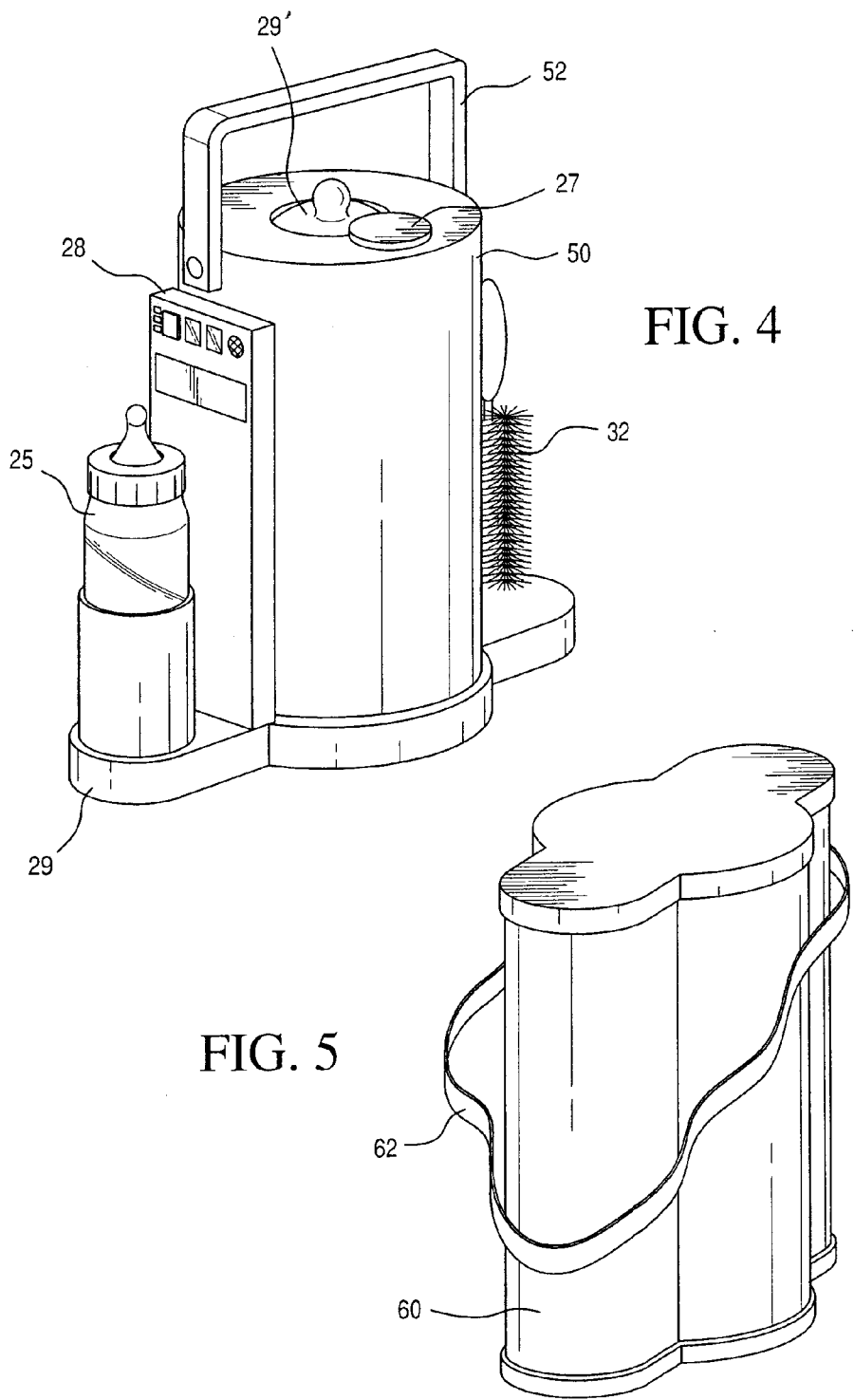

BABY FEEDING APPARATUS

FIELD OF THE INVENTION

This invention relates to a baby feeding apparatus and more particularly to an apparatus for preparing, weighing and warming infant formula with audio instructions.

BACKGROUND FOR THE INVENTION

Apparatus for heating and cooling baby bottles are well know and have been in use for many years. For example, a U.S. Pat. No. 4,597,435 of Fosco Jr. discloses a device for heating and cooling a baby bottle or similar article with a thermal transfer fluid. The device includes a container for holding the bottle in contact with a fluid such as water. The bottle is held on a platform above the bottom of a container and the liquid flows upwardly against the bottle.

A more recent approach to a bottle warmer is disclosed in a Padilla, U.S. Pat. No. 5,808,276 for a device for unattended simultaneously heating and agitating a bottle of infant formula. As disclosed, the formula preparation device comprises a housing in which a reciprocating semi-cylindrical closed in sleeve is located. The sleeve, in conjunction with a semi-cylindrical concavity in a cover of the device produces a cylindrical cavity within which a formula bottle is horizontally agitated while being heated to provide a warmed, agitated bottle of formula.

Another approach to provided heated infant formula is disclosed in a Shields et al., U.S. Pat. No. 6,417,498. As disclosed therein a receptacle-type heating device for automatically warming and vibrating a multitude of containers simultaneously in order to thaw, warm and mix cold or frozen liquid in an expedient and accurate manner. The device heats each container to a desired temperature using heated water with the container. The device includes a heater block having multiple walls therein and removable reservoirs disposed respectively within the wells for receiving the water. Heating elements are disposed between the removable reservoirs and the heater block within the walls for heating the removable reservoirs, the water and the containers placed therein. The container typically is a baby bottle, syringe, test tube or the like.

Finally, a container for promoting thermal transfer is disclosed in a U.S. Pat. No. 7,287,656 of Guilford III et al. The Guilford patent discloses a container that comprises an outer shell and an inner membrane with cooperatively defined a first compartment and a second compartment. The first compartment defines a first opening through which the first compartment receives a consumable liquid, the second compartment defines a second opening through which the second compartment receives a second liquid. The first compartment and the second compartment are shaped and arranged such that greater than 50% of the surface area of the second compartment is located adjacent to the first compartment. Alternatively, the first compartment and the second compartment may be shaped and arranged such that the first compartment substantially surrounds at least a portion of the second compartment.

Notwithstanding the above it is presently believed that there is a need and a potential commercial market for an improved baby feeding apparatus of the type disclosed herein. There should be a need and a potential market for such devices because they provide an apparatus for preparing, weighing and warming infant formula with audio instructions. In addition the devices in accordance with the present invention are durable, easy to use with verbal instructions for their use, and presently believed to be manufactured at a competitive cost.

BRIEF SUMMARY OF THE INVENTION

In essence a baby feeding apparatus for the preparation and warming of infant formula with audio instructions includes a baby bottle for receiving a quantity of formula for a baby, a scale for measuring an amount of formula in the bottle, means for heating the formula in the bottle, and a temperature sensor for indicating the temperature of the formula in the bottle. Audio means and electrical means for energizing the means for heating and the audio means provide instructions for mixing, measuring and warming the formula in the bottle and advising an individual that the temperature is in a proper range for feeding the formula to a baby.

The invention will now be described in connection with the accompanying drawings wherein like reference numerals have been used to indicate like parts.

DESCRIPTION OF THE DRAWINGS

FIG. 4 is a perspective view of a speaking feeding bottle in accordance with the present invention; and FIG. 5 is a perspective view illustrating a further embodiment of the invention

DESCRIPTION OF THE PREFERRED EMBODIMENTS OF THE INVENTION

Figure 1:
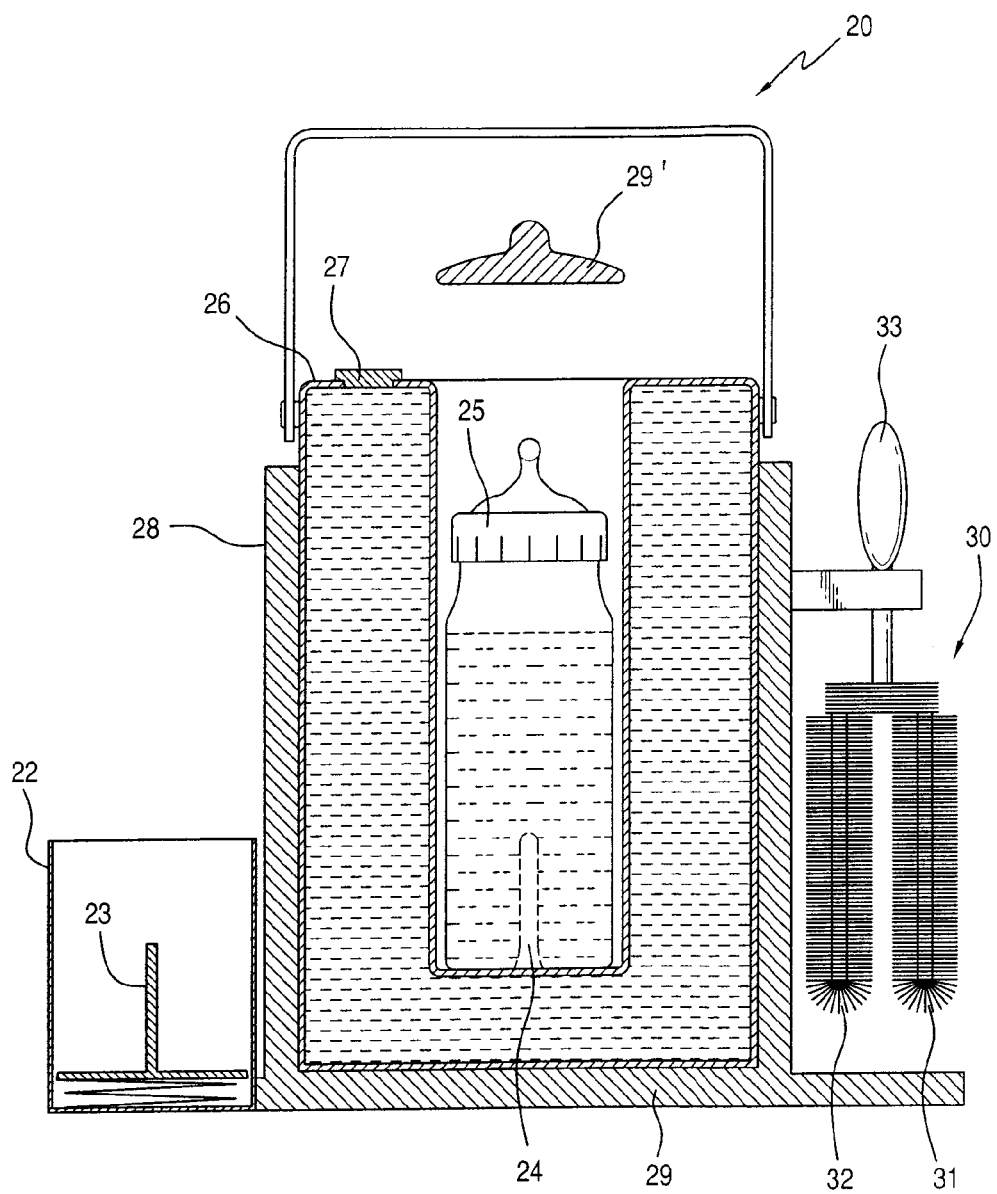
FIG. 1 is a cross sectional view of a baby feeding apparatus in accordance with the present invention.

Referring now to the drawings there are illustrated therein a formula preparation and warming device in accordance with the present invention. As shown in FIG. 1 an apparatus 20 for the preparation and warming formula for feeding an infant includes a bottle holder 22 with a heat probe 23 that extends upwardly into a thermal well 24 formed in a lower portion of a bottle 25 for heating the formula contained in the bottle. The apparatus 20 also includes a reservoir 26 that surrounds the bottle 25 and is filled with heated water that is used for heating the formula in the bottle or maintaining the formula at a pre-selected temperature.

The reservoir 26 is contained in a receptacle 28 that includes an upwardly extending wall and a base 29. The reservoir 26 has an outer shape of a right circular cylinder that corresponds to the right circular cylinder shape of the receptacle 28 and fits therein with an open center portion for receiving the baby bottle 25 therein with the reservoir surrounding the bottle 25. As shown the reservoir is filled with heated water by means of a cap 27. A second cap 29' covers the central open portion of the reservoir 26 as well as the bottle 25.

Figure 3:
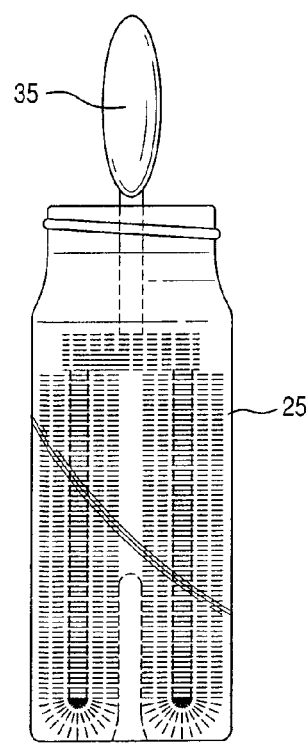
FIG. 3 illustrates a unique brush for cleaning the inside of a bottle as used in the present invention.

The apparatus 20 also includes a uniquely shaped cleaning brush 30 that includes two parallel cylindrical brush elements 31 and 32 that are adapted to straddle the thermo well 24, for cleaning the inside of the bottle 25, by twisting a brush handle 33 back and forth with the brush elements inside of the bottle 25 as shown in FIG. 3.

Figure 2:
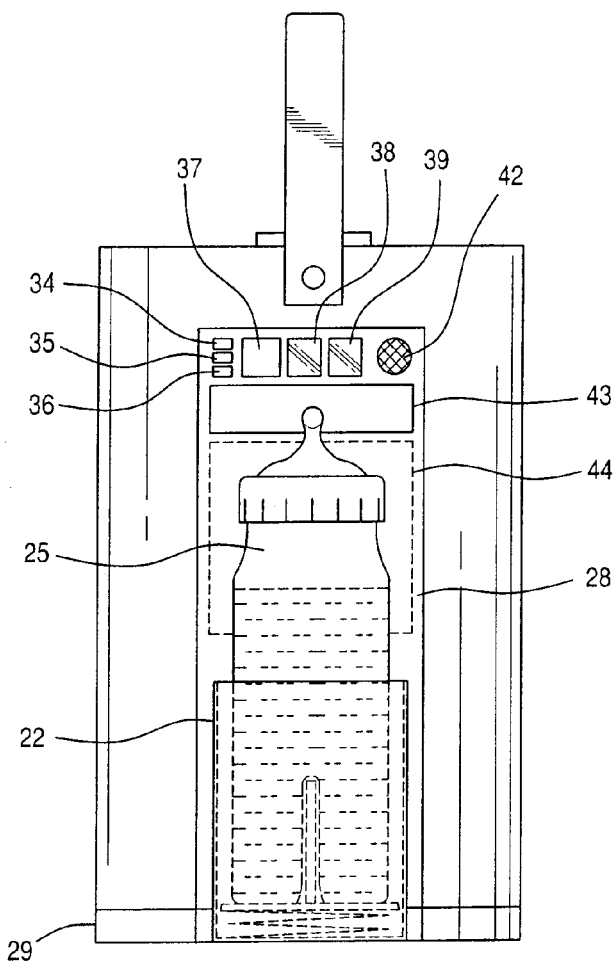
FIG. 2 is side elevational view of the device shown in FIG. 1.

Referring now to FIG. 2 an upper portion of the upwardly extending wall 28 adjacent to the bottle holder 22 includes green, yellow and red indicator lights 34, 35 and 36 respectively. The green indicator is lit when the temperature of the formula within the bottle is between 32 and 33° C. and serves to warn an individual that the infant's formula is still too cool to feed a baby. The green indicator light may be accompanied by an audio warning that the formula is still too cool to feed to the baby. The yellow indicator light is programmed to be illuminated when the temperature of the formula is between 36-37° C. and accompanied by an audible command that the infant formula is now at an ideal temperature for feeding. However, if the temperature 39° C. the red light is lit and an audio command warns an individual that the formula is too hot for the baby.

An on/off switch 37 is also provided to turn the probe 23 on or off in heating the infant formula. A weight indicator screen 38 indicates the weight recorded by an electronic scale 40 while an actual temperature of the formula is displayed on a screen 39. The apparatus 20 also includes a speaker 42 as well as a digital timer 43 and a 9V rechargeable battery 44.

FIG. 4 shows a further embodiment of the invention which includes an outer cover 50 and handle 52. The outer cover 50 encloses the reservoir 26.

Finally, a further embodiment of the invention incorporates an outer cover 60 that encloses the bottle 25, reservoir 26 and brush 32 and snaps onto the base 29 in a conventional manner. A handle 62 is attached to the outer cover 60.

While the invention has been described in connection with its preferred embodiment, it should be recognized that changes and modifications may be made therein without departing from the scope of the appended claims.

What is claimed is:

1. A baby feeding apparatus for the preparation, weighing and warming infant formula with audio instructions and music, said apparatus consisting of:

a baby bottle for receiving a quantity of formula for a baby including a central thermal well extending upwardly from a central bottom of said bottle upwardly into a lower portion of said bottle and an upwardly extending heat probe extending into said thermal well for heating the contents of said bottle;

a scale for measuring an amount of formula in said bottle;

means including said upwardly extending heat probe for heating the formula in said bottle; and a temperature sensor which includes red, yellow and green warning lights for indicating the temperature of the formula in said bottle is over 39° C., between 36 and 37° C. that is the suitable range for feeding a baby and between 32 and 33° C. that is too cold for feeding respectively for indicating the temperature of the formula in said bottle;

audio means consisting of a recording and a speaker including instructions for preparing the formula and warming the formula, music for soothing the baby during feeding and an audible command accompanying the lights that the infant formula is now at an ideal temperature for feeding when the temperature is between 36 and 37° C., is too hot for feeding when the temperature is 39° C. and too cold for feeding when the temperature is 33° C.;

an electrical means for energizing said heating means and said audio means and advising an individual the formula is at a pre-selected temperature for feeding a baby and wherein said apparatus further consists of a cylindrically annular reservoir of heated water bounding a bottle-receiving cavity therein and extending around said baby bottle to maintain said formula at a pre-selected temperature, and a 9V rechargeable battery for energizing said apparatus and said apparatus further consisting of an inverted U-shaped cleaning brush, and an outer housing to cover said baby bottle, said reservoir and said brush and wherein said brush consists of an upward portion and two parallel downwardly extending cylindrical lower bristle portions for engaging the inner surface of said bottle and said thermal well that extends upwardly into said lower portion of said bottle and said two parallel downwardly extending cylindrical bristle portions engage said thermal well; and a handle attached to said outer housing.

* * * * *